United States Patent [19]

Schulte et al.

[11] Patent Number: 5,119,580
[45] Date of Patent: Jun. 9, 1992

[54] DEVICE FOR JIGGING A FISHING POLE

[76] Inventors: Timothy M. Schulte; Richard S. Schulte, both of 6324 Material Ave., Loves Park, Ill. 61111

[21] Appl. No.: 716,294

[22] Filed: Jun. 17, 1991

[51] Int. Cl.⁵ .................. A01K 87/00; F16M 13/00
[52] U.S. Cl. ................................ 43/19.2; 43/26.1; 248/522; 248/538
[58] Field of Search ............ 43/19.2, 26.1, 21.2; 248/514, 500, 289.1, 538, 522; 116/22 A; 52/101

[56] References Cited

U.S. PATENT DOCUMENTS

| | | | |
|---|---|---|---|
| 3,600,837 | 8/1971 | Bristol | 43/19.2 |
| 3,623,259 | 11/1971 | Rode | 43/19.2 |
| 4,074,653 | 2/1978 | Pember | 116/22 A |
| 4,251,939 | 2/1981 | Tiede | 43/26.1 |
| 4,948,083 | 8/1990 | McNaney, Jr. et al. | 43/21.2 |

Primary Examiner—Richard K. Seidel
Assistant Examiner—Chuck Y. Mah
Attorney, Agent, or Firm—Leydig, Voit & Mayer

[57] ABSTRACT

A fishing pole holder is pivotally mounted on the upper end portion of an upright tubular housing to rock upwardly and downwardly about a horizontal axis. A battery-operated motor is contained in the housing and is operable to rotate a cam having a plurality of angularly spaced lobes which act against a cam follower on the holder to rock the latter upwardly and downwardly. With this arrangement, a fishing pole supported in the holder may be automatically moved upwardly and downwardly in order to jig a lure in the water.

9 Claims, 1 Drawing Sheet

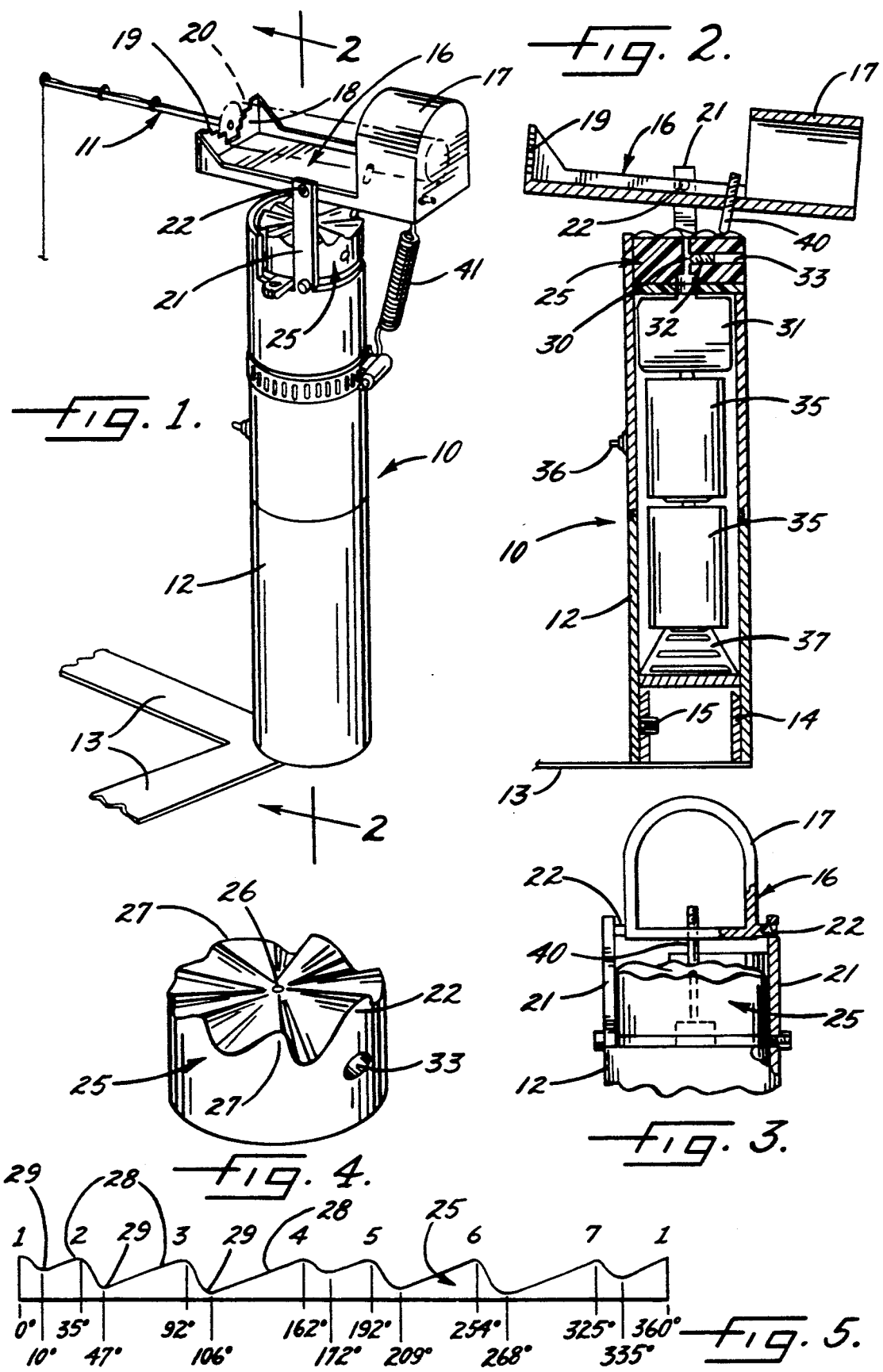

DEVICE FOR JIGGING A FISHING POLE

BACKGROUND OF THE INVENTION

In ice fishing, it is customary to "jig" for fish by moving a lure upwardly and downwardly in the water for the purpose of attracting a fish. Conventionally, jigging is accomplished by manually moving a fishing pole upwardly and downwardly in order to raise and lower the lure. The fisherman usually jigs through different distances and with different frequencies and motions in an effort to best attract the fish to the lure.

Ice fishermen usually set several poles. Since one fisherman usually can manually jig only one pole at a time, several poles must remain stationary and are not as effective to catch fish as the "jigged" pole.

SUMMARY OF THE INVENTION

The general aim of the present invention is to provide a unique device which automatically jigs a fishing pole and which enables several poles to be jigged simultaneously.

Another object of the invention is to provide an automatic fishing pole jigger which enables the lure to be jigged through different distances and with different frequencies and motions.

A more detailed object of the invention is to achieve the foregoing through the provision of a device having a pivotally mounted fishing pole holder which is adapted to be swung upwardly and downwardly in response to rotation of a multi-lobed cam by a battery-operated motor.

The invention also resides in the novel construction of the cam to enable the pole to be jigged with different motions over a given period of time.

BRIEF DESCRIPTION OF THE DRAWINGS

FIG. 1 is a perspective view of a new and improved fishing pole jigging device incorporating the unique features of the present invention.

FIG. 2 is a cross-section taken substantially along the line 2—2 of FIG. 1.

FIG. 3 is a rear elevational view of the upper portion of the jigging device, certain parts being broken away and shown in section.

FIG. 4 is a perspective view of the cam.

FIG. 5 is a roll-out view which diagrammatically shows the active cam surface of the cam.

DETAILED DESCRIPTION OF THE PREFERRED EMBODIMENT

The present invention contemplates the provision of a device 10 for automatically moving a fishing pole 11 upwardly and downwardly to cause a lure (not shown) to jig up and down in the water. The device 10 is especially suitable for use in ice fishing and, by using a plurality of devices 10, an ice fisherman may set several poles and they will all work with a jigging action.

More specifically, the device 10 comprises an upright stand which herein is in the form of a tubular housing 12. Feet 13 are located at the lower end of the housing and support the latter in a standing position. The feet may be secured to a plug 14 (FIG. 2) which is releasably held in the lower end of the housing by a detent 15 and which may be removed to allow disassembly of the feet from the housing for purposes of storage.

A fishing pole holder 16 is located adjacent the upper end of the housing 12. While the holder may take various forms, it herein includes a closed-end pocket 17 at one end for telescopically receiving the butt end portion of the pole 11. The opposite end portion of the holder includes an upright plate 18 (FIG. 1) formed with a serrated and generally V-shaped notch 19 for cradling the grip 20 of the pole 11.

In carrying out the invention, the holder 16 is pivotally supported on the housing 12 to swing upwardly and downwardly about a generally horizontal axis. For this purpose, two diametrically spaced fingers 21 are formed integrally with and extend upwardly from the housing and are formed with holes which receive trunnions 22 projecting from the holder. One of the trunnions may be in the form of a screw to enable assembly of the holder with the housing.

Further in keeping with the invention, a unique cam 25 is located adjacent the upper end of the housing 12 and is operable to rock the holder 16 upwardly and downwardly about the axis defined by the trunnions 22. The cam is a generally cylindrical block made of rigid plastic and formed with a central axially extending hole 26 (FIG. 4). The upper surface of the cam defines a cam surface and is formed with several (e.g., seven or eight) lobes 27 which are spaced angularly around the hole 26. Each lobe includes a rise portion 28 (FIG. 5) and a fall portion 29.

The cam 25 is secured to the upwardly extending output shaft 30 (FIG. 2) of an electric gear motor 31 which is supported within the upper end portion of the housing 12. A set screw 32 extends through a radially extending hole 33 in the cam 25 and releasably fastens the cam to the shaft. The gear motor may, for example, be a Series 3440 dc. motor sold by Hankscraft Motors. Such a motor has a gear ratio of 1740 to 1 and operates at one revolution per minute under a no-load condition. Two D-size dry cell batteries 35 are contained in the housing 12 beneath the motor 31 and are operable to energize the motor when an on/off switch 36 is closed. A leaf spring 37 in the housing biases the batteries upwardly toward a terminal (not visible) of the motor and forms part of the energizing circuit.

The jigging device 10 is completed by a cam follower 40 (FIGS. 1 and 2) which may be in the form of a round nose set screw threaded substantially vertically through the holder 16 and positioned with its lower end in contact with the upper cam surface of the cam 25. As shown most clearly in FIG. 2, the cam follower is offset laterally from a vertical plane which contains the axis of the shaft 30 and the axes of the trunnions 22 and thus the follower is effective to cause the holder 16 to rock upwardly and downwardly about the trunnions when the cam is rotated by the shaft. A contractile spring 41 (FIG. 1) is stretched between the housing 12 and the pocket 17 of the holder and is effective to bias the holder clockwise (FIG. 2) about the trunnions 22 in order to keep the lower end of the follower in engagement with the cam surface of the cam 25.

With the foregoing arrangement, closure of the switch 36 results in energization of the motor 31 to produce slow rotation of the shaft 30 and the cam 25. As the cam rotates, its lobes 27 turn past the follower 40 and, when a rise 28 encounters the follower, the holder 16 is pivoted counterclockwise (FIG. 2) to rock the pole 11 downwardly and lower the lure. As a fall 29 encounters the follower 40, the spring 41 rocks the holder clockwise to raise the pole and the lure. In this way, a periodic jigging action is produced in order to cause the lure to be more effective in attracting fish.

A significant advantage of the present jigging device 10 is that a non-uniform jigging action is produced. For this purpose, the various lobes 27 of the cam 25 are of a non-uniform shape and cause the pole 11 to jig through different distances and at different rates and frequencies during each revolution of the cam. This is most apparent from FIG. 5, which is a roll-out view of the lobes 27 of the cam. By way of example, it will be seen that the fall 29 between lobes Nos. 1 and 2 is significantly shallower than the fall between lobes Nos. 2 and 3. Thus, when the follower 40 encounters the fall between lobes Nos. 2 and 3, the pole 11 will be raised through a greater distance than when the follower drops into the fall between lobes Nos. 1 and 2. As a further example, it will be seen that the rise 28 and fall 29 between lobes Nos. 2 and 3 span an angular distance of about 57 degrees while the rise and fall between lobes Nos. 3 and 4 extend through an angular distance of about 70 degrees. As a result, the pole 11 will be jigged at a much faster rate when the follower encounters the cam surface between lobes Nos. 2 and 3 than when the follower encounters the cam surface between lobes Nos. 3 and 4. By varying the angular length of the rises 28 with respect to the angular length of the falls 29, the pole 11 can be made to move upwardly at one rate and downwardly at a different rate as the space between two adjacent lobes passes beneath the follower 40.

By using cams which are shaped differently from the cam 25, the fisherman may cause an entirely different jigging action to be produced. Also, because the cam 25 is made of plastic, the fisherman can shave away the material with a knife and create a customized cam of his own specific liking.

We claim:

1. A device for periodically jigging a fishing pole upwardly and downwardly, said device comprising an upright stand, a fishing pole holder pivotally supported on said stand to swing upwardly and downwardly about a generally horizontal axis, an electrically operated motor supported by said stand and having an output shaft rotatable about a predetermined axis, a cam rotatable with said shaft and having a cam surface with a plurality of alternating rises and falls spaced angularly about said predetermined axis, and a cam follower carried by said holder and engageable with said cam surface whereby rotation of said cam by said shaft causes said holder to swing upwardly and downwardly about said horizontal axis as said rises and falls rotate past said follower.

2. A device as defined in claim 1 in which at least some of said falls are of different depths than other ones of said falls, at least some of said rises being of different angular lengths than other ones of said rises.

3. A device as defined in claim 1 in which said stand is a tubular housing, said motor being contained within said housing, said shaft projecting upwardly from said housing whereby said predetermined axis is generally vertical.

4. A device as defined in claim 3 further including battery means in said housing for operating said motor.

5. A device as defined in claim 1 in which said shaft projects upwardly and is disposed in substantially the same vertical plane as said horizontal axis, said follower being offset from said plane.

6. A device for periodically jigging a fishing pole upwardly and downwardly, said device comprising an upright tubular housing having an upper end portion, a fishing pole holder pivotally supported on the upper end portion of said housing to swing upwardly and downwardly about a generally horizontal axis, an upright shaft located adjacent the upper end portion of said housing, an electric motor within said housing and operable when energized to rotate said shaft, battery means in said housing for energizing said motor, a cam rotatable with said shaft and having an upwardly facing cam surface with a plurality of alternating rises and falls spaced angularly around said shaft, and a cam follower secured to and depending from said holder and engageable with said cam surface whereby rotation of said cam by said shaft causes said holder to swing upwardly and downwardly about said horizontal axis as said rises and falls rotate past said follower.

7. A device as defined in claim 6 in which at least some of said falls are of different depths than other ones of said falls, at least some of said rises being of different angular lengths than other ones of said rises.

8. A device as defined in claim 6 in which said horizontal axis and the axis of said shaft are disposed substantially in a common vertical plane, said follower being offset from said plane.

9. A device as defined in claim 8 further including spring means connected between said holder and said housing and urging said holder about said horizontal axis in such a direction as to keep said follower pressed against said cam surface.

* * * * *